US012506337B2

(12) United States Patent
Rakshit et al.

(10) Patent No.: US 12,506,337 B2
(45) Date of Patent: Dec. 23, 2025

(54) LOCATION OPTIMIZATION FOR AN AUTONOMOUS POWER GENERATION UNIT

(71) Applicant: International Business Machines Corporation, Armonk, NY (US)

(72) Inventors: Sarbajit K. Rakshit, Kolkata (IN); Jagabondhu Hazra, Bangalore (IN); Manikandan Padmanaban, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 18/232,702

(22) Filed: Aug. 10, 2023

(65) Prior Publication Data

US 2025/0055278 A1 Feb. 13, 2025

(51) Int. Cl.
*H02J 3/00* (2006.01)
*B64U 101/10* (2023.01)
(Continued)

(52) U.S. Cl.
CPC .............. *H02J 3/004* (2020.01); *G05D 3/105* (2013.01); *H02S 10/12* (2014.12); *H02S 10/40* (2014.12);
(Continued)

(58) Field of Classification Search
CPC ...... H02J 3/004; H02J 2203/20; G05D 3/105; H02S 10/12; H02S 10/40; H02S 20/32; B64U 10/00; B64U 2101/10
See application file for complete search history.

(56) References Cited

U.S. PATENT DOCUMENTS

| 4,278,829 A | 7/1981 | Powell |
| 4,316,448 A | 2/1982 | Dodge |

(Continued)

FOREIGN PATENT DOCUMENTS

| CN | 106314806 A | 1/2017 |
| CN | 109611276 A | 4/2019 |

(Continued)

OTHER PUBLICATIONS

Mehdi Jahangiri et al., Finding the best locations for establishment of solar-wind power stations in Middle-East using GIS: A review, 66 Renewable and Sustainable Energy Reviews (pp. 38-52) (Year: 2016).*

(Continued)

*Primary Examiner* — Justin R. Blaufeld
(74) *Attorney, Agent, or Firm* — Garg Law Firm, PLLC; Rakesh Garg; Michael O'Keefe

(57) ABSTRACT

An embodiment selects, from a set of candidate locations within a power generation site, a first power generation location. An embodiment causes generation of electricity, by a first power generation unit, at the first power generation location. An embodiment forecasts, during the generation of electricity, a future power generation status of the first power generation unit at the first power generation location. An embodiment causes relocating, responsive to the future power generation status, of the first power generation unit to a second power generation location, the relocating altering the future power generation status.

18 Claims, 9 Drawing Sheets

(51) Int. Cl.
*G05D 3/10* (2006.01)
*H02S 10/12* (2014.01)
*H02S 10/40* (2014.01)
*H02S 20/32* (2014.01)
*B64U 10/00* (2023.01)

(52) U.S. Cl.
CPC .............. *H02S 20/32* (2014.12); *B64U 10/00* (2023.01); *B64U 2101/10* (2023.01); *H02J 2203/20* (2020.01)

(56) References Cited

U.S. PATENT DOCUMENTS

| | | | |
|---|---|---|---|
| 5,449,413 | A | 9/1995 | Beauchamp et al. |
| 7,045,702 | B2 | 5/2006 | Kashyap |
| 8,330,296 | B2 | 12/2012 | Ottman |
| 8,448,898 | B1 | 5/2013 | Frolov et al. |
| 9,599,299 | B2 | 3/2017 | Hoang |
| 2011/0089698 | A1 | 4/2011 | Ahmadi |
| 2016/0105145 | A1 | 4/2016 | Drake |
| 2017/0033733 | A1 | 2/2017 | Chandan et al. |
| 2018/0248509 | A1 | 8/2018 | Dayama et al. |
| 2019/0257291 | A1* | 8/2019 | An .................. F03D 80/00 |
| 2020/0021237 | A1 | 1/2020 | Bassi |
| 2020/0127598 | A1* | 4/2020 | Chang ................ G06Q 50/06 |
| 2021/0028739 | A1* | 1/2021 | Ramos ................ H02S 10/40 |
| 2021/0126573 | A1* | 4/2021 | Jakobsen .......... F16M 11/2021 |
| 2022/0001549 | A1* | 1/2022 | Vadayadiyil Raveendran ............ G06Q 10/06 |
| 2022/0321055 | A1 | 10/2022 | Lisoski et al. |

FOREIGN PATENT DOCUMENTS

| | | |
|---|---|---|
| DE | 202023000178 U1 | 2/2023 |
| KR | 101124172 B1 | 3/2012 |
| KR | 102250247 B1 | 5/2021 |
| WO | 2009079261 A2 | 6/2009 |
| WO | 2016053215 A1 | 4/2016 |

OTHER PUBLICATIONS ip.com, Micro turbine array usage in multiple applications, Mar. 28, 2011.
Nene, Drones Harvest High-Altitude Wind Energy, May 6, 2019, https://dronebelow.com/2019/05/06/drones-harvest-high-altitude-wind-energy/.
Solar Mag, Transparent Solar Panels: Reforming Future Energy Supply, Feb. 29, 2020, https://solarmagazine.com/solar-panels/transparent-solar-panels/.
Whitlock, Power-Blox uses swarm power to create intelligent autonomous energy grids, May 16, 2017, https://www.renewableenergymagazine.com/energy_saving/powerblox-uses-swarm-power-to-create-intelligent-20170516.
Aiello, et al., Energy Consumption Model of Aerial Urban Logistic Infrastructures, Energies, Aug. 10, 2021, vol. 14, Issue 5998, 19 pages.

* cited by examiner

LOCATION OPTIMIZATION FOR AN AUTONOMOUS POWER GENERATION UNIT

BACKGROUND

The present invention relates generally to renewable power generation. More particularly, the present invention relates to a method, system, and computer program for location optimization for an autonomous power generation unit.

Renewable power generation refers to electrical power generation from wind, solar, or water power—in other words, electrical power generation using a renewable source rather than a fossil fuel source.

An autonomous vehicle (AV) has an ability to relocate itself, along a land surface (e.g., a road or field, in the case of an autonomous car), in or on top of water (e.g., an autonomous boat), or in the air (e.g., an autonomous aircraft or drone). Some AVs are configured to generate electricity or electrical power from renewable sources in their environment, and are thus referred to as autonomous power generation units. For example, an autonomous power generation unit might include a wind turbine for converting wind power to electricity, a solar panel for converting sunlight to electricity, a solar panel coating one or more surfaces of a wind turbine's blades (for a combination of wind and solar power), a water turbine for converting water power to electricity, a water turbine with a wind or solar power generation attachment, and the like. Some autonomous power generation units are configured to provide generated electrical power to a power grid via a base station. Some autonomous power generation units are configured to store generated electrical power in a battery for later transmission to a power grid via a base station. Some autonomous power generation units are configured to transmit generated power to a power grid via wireless power transmission (e.g., using a microwave beam), either during power generation or at a later time. Storing generated power for use at a later time helps compensate for variations in generated power, for example due to wind speed variations or when sunlight is diminished (e.g., due to clouds) or unavailable (e.g., at night).

SUMMARY

The illustrative embodiments provide for location optimization for an autonomous power generation unit. An embodiment includes selecting, from a set of candidate locations within a power generation site, a first power generation location. An embodiment includes causing generation of electricity, by a first power generation unit, at the first power generation location. An embodiment includes forecasting, during the generation of electricity, a future power generation status of the first power generation unit at the first power generation location. An embodiment includes causing relocating, responsive to the future power generation status, of the first power generation unit to a second power generation location, the relocating altering the future power generation status. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
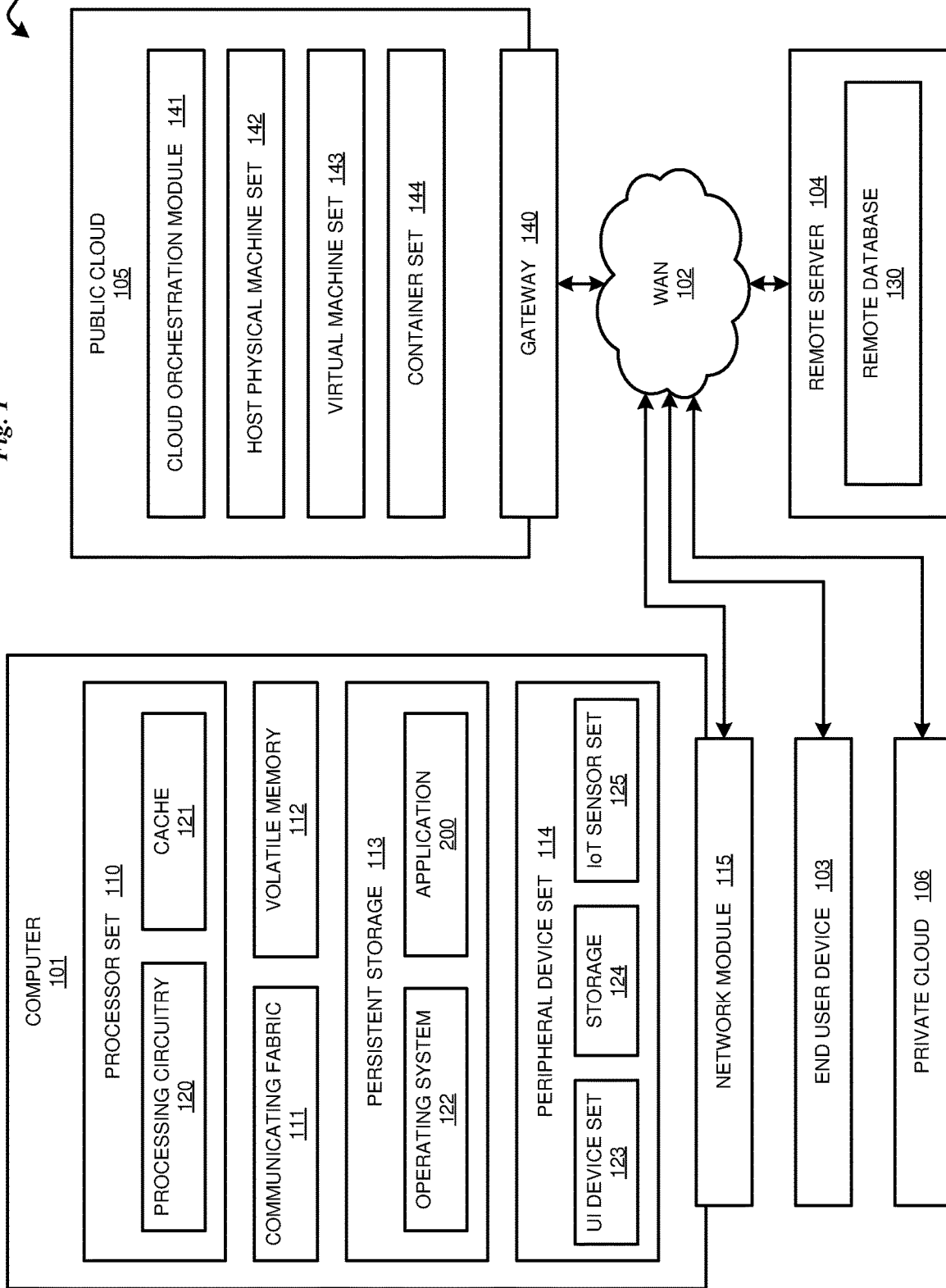
FIG. 1 depicts a block diagram of a computing environment in accordance with an illustrative embodiment.

The illustrative embodiments recognize that generating electricity from renewable sources such as wind, solar, and water helps meet future energy needs without burning fossil fuels. However, to justify the expense of installing power generation units that have a fixed location, that location must be able to generate power a sufficiently higher percentage of the time. This can pose a problem, for example, in densely populated cities where rooftop power generate sites might be shadowed part of the day by taller buildings or trees, or surrounding buildings might block wind from a particular direction. Thus, the illustrative embodiments recognized that there is a need to use autonomous power generation units add to the possible sites for power generation from renewable sources, thus increasing this type of power generation.

The present disclosure addresses the deficiencies described above by providing a process (as well as a system, method, machine-readable medium, etc.) that selects a first power generation location from a set of candidate locations within a power generation site, causes generation of electricity, by a first power generation unit, at the first power generation location, forecasts, during the generation of electricity, a future power generation status of the first power generation unit at the first power generation location, and relocates, responsive to the future power generation status, the first power generation unit to a second power generation location, the relocating altering the future power generation status. Thus, the illustrative embodiments provide for location optimization for an autonomous power generation unit.

An embodiment receives a designated power generation site, or selects a power generation site using data provided to the embodiment. A power generation site is an area in which one or more autonomous power generation units operate. One non-limiting example of a power generation site is a rooftop of a building in a city. An embodiment also receives or selects power generation unit characteristics and other power generation unit data for a set of power generation units to be used at the power generation site.

One embodiment selects power generation unit characteristics that are appropriate to a received or already-selected power generation site. For example, it might be cost-effective to deploy power generating units using solar power, but not cost-effective to deploy power generating units using wind power, at a particular site. As another example, a particular site might be too small to cost-effectively generate solar power, but have enough area to cost-effectively generate wind power. As a third example, one site might be flat and smooth enough to allow the use of autonomous power generating units with wheels, but another site might not be sufficiently flat, necessitating the use of autonomous aerial power generating units.

Another embodiment selects a power generation site using characteristics of a received or already-selected autonomous power generation unit to be used at the site. For example, if the autonomous power generation units to be used at the site are all solar power generation units that move using wheels, an embodiment can eliminate possible power generation sites that are too small to host the number of units required for a cost-effective installation, too shaded to generate sufficient power to justify the installation, and insufficiently flat to allow the use of wheels. To select autonomous power generating units, an embodiment receives specifications of possible autonomous power generating units (e.g., locomotion method and specifications for conditions under which the locomotion method is usable, solar panel area and power conversion efficiency at particular light levels, wind turbine area and power conversion efficiency at particular wind speeds, an installation and maintenance cost of each unit, and the like), or a requirements specification a selected autonomous power generating unit must meet (e.g., must use wheels for locomotion, must have a solar panel area within a particular range, must have a power conversion efficiency above a specified threshold, and the like). To select a power generation site, an embodiment receives mapping and meteorological data for an area including the site (e.g., rooftop area and surface smoothness of a particular building, nearby structures that might block wind or sun from reaching a particular rooftop, seasonal variations in expected wind speed and direction within a typical day, seasonal variations in expected amount of sunlight and sun direction, and the like), or a requirements specification a selected power generation site must meet (e.g., rooftop area above a specified threshold, rooftop angle below a specified threshold, a number of hours of sunlight per day or average wind speed per day above a specified threshold, and the like).

Another embodiment uses cost data and a cost requirements specification to select an autonomous power generating unit, power generation site, or a combination. For example, for a cost-effective implementation, the cost of obtaining and maintaining autonomous power generating units and the site on which they operate must be a specified amount or percentage below the income produced by using the autonomous power generating units to generate power at the site.

An embodiment designates a set of candidate locations within a selected power generation site includes. Candidate locations are locations at which an autonomous power generation unit could be situated to perform a particular task, such as generating electricity or sending generated power to a power grid. For example, if the selected power generation site is a rectangular rooftop, an embodiment might divide the rooftop into a grid, and the set of candidate locations might be individual cells within the grid. However, the set of candidate locations need not be any particular shape, or adjacent or contiguous with each other. Some candidate locations vary in their characteristics. For example, one candidate location might be in shadow at a particular time of day, or protected from wind from a particular direction, or include a base station a power generation unit could use to send generated power to a power grid.

An embodiment attempts to maximize the electricity generated by autonomous power generation units at a power generation site, by keeping autonomous power generation units in the maximum amount of sun, wind, or another power generation modality as possible. An embodiment also attempts to minimize operations that spend electricity, such as that spent moving an autonomous power generation unit from one candidate location to another to improve power generation or send generated power to a power grid. In particular, at each time step, an embodiment attempts to position a power generation unit at a candidate location that is forecast to be as best as possible for the next N time steps. In embodiments, N is a user-defined or predefined parameter. Thus, an embodiment uses a presently available optimization solving technique (e.g., a quadratic optimization solver) to minimize a cost function J for the available power generation units and candidate locations. In one embodiment, J is the sum, for each time step i into the future from 1 (now) to N, of $w_{Hi}(W_i^r - W_i^m)^2 + w_{Li}(L_i^r - L_i^m)^2 + E_i + w_{uHi}(\Delta u)^2 + w_{vLi}(\Delta v)^2 + E_{di}$, where $W_i^r$ represents the available wind speed for time i, $W_i^m$ represents the captured wind speed for time i, $L_i^r$ represents the available light intensity for time i, $L_i^m$ represents the captured light intensity for time i, $E_i$ represents energy lost to relocate an autonomous power unit, $E_{di}$ represents energy lost to deliver electrical power to a grid by relocating to a base station or transmitting power wirelessly, u represents wind intensity, v represents light intensity, $w_{Hi}$ represents a weighting coefficient for generating electricity from wind at time i, $w_{Li}$ represents a weighting coefficient for generating electricity from light at time i, and $w_{uHi}$ and $w_{vLi}$ represent penalizing coefficients for changes in wind and light respectively. If a power generation unit is not capable of generating electricity from one of light or wind, corresponding weighting terms are set to zero to remove those terms from the cost function. If a power generation unit is capable of generating electricity from another source, an embodiment adds one or more additional terms to the cost function in a manner described herein. Another embodiment includes a term representing a distance involved in delivering generated power to a power grid in the cost function. Additional terms in the cost function, and different cost functions, are also possible and contemplated within the scope of the illustrative embodiments. An embodiment obtains values for captured wind speed and captured light intensity from current or forecast meteorological data, from data of the selected power generation site, or a combination. For example, data of the selected power generation site might indicate that some candidate locations are protected from wind from a particular direction, current meteorological data might indicate the current wind speed and direction, and forecast meteorological data might indicate forecast wind speed and direction for particular times in the future. In one embodiment, weighting coefficients are constant for all time steps. In another embodiment, weighting coefficients decrease linearly with time steps. In another embodiment, weighting coefficients decrease exponentially with time steps. Decreasing weighting coefficients with time prioritizes current conditions over future conditions.

One embodiment selects an initial power generation location from the set of candidate locations using a modified cost function J, which is the sum, for each time step i into the future from 1 (now) to N, of $w_{Hi}(W_i^r-W_i^m)^2+w_{Li}(L_i^r-L_i^m)^2+w_{uHi}(\Delta u)^2+w_{vLi}(\Delta v)^2+E_{di}$, if sufficient data is available. Another embodiment selects an initial power generation location from the set of candidate locations using a modified cost function J, which is the sum, for each time step i into the future from 1 (now) to N, of $w_{Hi}(W_i^r-W_i^m)^2+w_{Li}(L_i^r-L_i^m)^2$, if sufficient data is available. Another embodiment selects an initial power generation location to maximize power generation under current conditions, without performing a forecast. Another embodiment selects an initial power generation location randomly, using a pseudo-random number generator. Another embodiment selects an initial power generation location using another presently available selection technique.

An embodiment causes generation of electricity, by an autonomous power generation unit, at the selected power generation location. An embodiment forecasts, during the generation of electricity, a future power generation status of a power generation unit at the selected power generation location, and uses the future power generation status to decide whether or not to relocate a power generation unit. An embodiment relocates, or causes relocation of, a power generation unit to a second power generation location responsive to the future power generation status. One embodiment causes relocation of an autonomous power generation unit by commanding the power unit to relocate itself to the new location.

The relocation alters the future power generation status. For example, if the future power generation status was forecast to decrease due to a shadow or a change in wind speed or direction, the relocation is to a location that avoids the forecast decrease. As another example, if the future power generation status was forecast to decrease due to a power generation unit's storage battery being full, the relocation is to a location where stored electricity in the battery can be sent to a power grid. As a third example, if the future power generation status was forecast to decrease due to sunset or a decrease in wind speed, the relocation is to a location where stored electricity in a power generation unit's battery can be sent to a power grid, thus buffering electricity provision to the grid.

An embodiment repeats the forecasting and relocation responsive to the future power generation status. If available, an embodiment uses updated forecasts or current meteorological data when repeating the forecasting and relocation. One embodiment uses a machine learning model (a presently available technique) to adjust one or more weights in the cost function using the effects of past meteorological conditions and forecasts on power generation at candidate locations within the power generation site. For example, an embodiment might learn that a power generation unit in a particular candidate location does not generate sufficient electricity when the wind is from the north, due to the sheltering of that location by an adjacent building. As another example, an embodiment might learn changes in shadow configurations due to the changing sun angles at different times of the year, or altered configurations of shadow-casting elements affecting a power generation site. Another embodiment uses a learning model to adjust weights in the cost function based on seasonal patterns. For example, an embodiment might learn that cloudy mornings and sunny afternoons are typical in summer at a particular power generation site, and adjusts weights in the cost function accordingly. Another embodiment uses a learning model to adjust weights or terms in the cost function using the results of a past relocation. For example, an embodiment might learn how long power generation units take to travel between particular candidate locations, or that some forecast wind or light changes are too small to justify relocation.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved application 200 that provides location optimization for an autonomous power generation unit. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
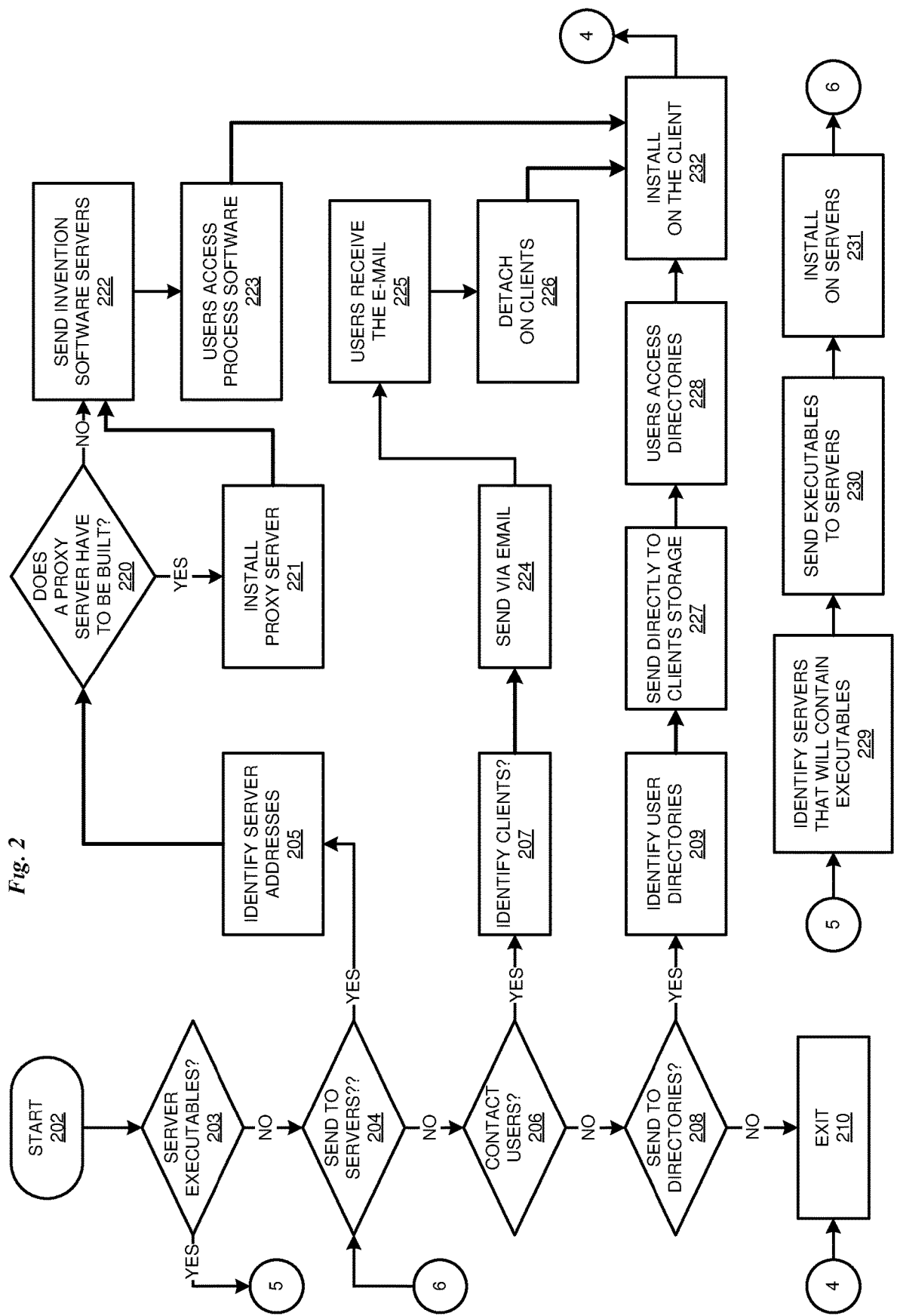
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing location optimization for an autonomous power generation unit may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

Figure 3:
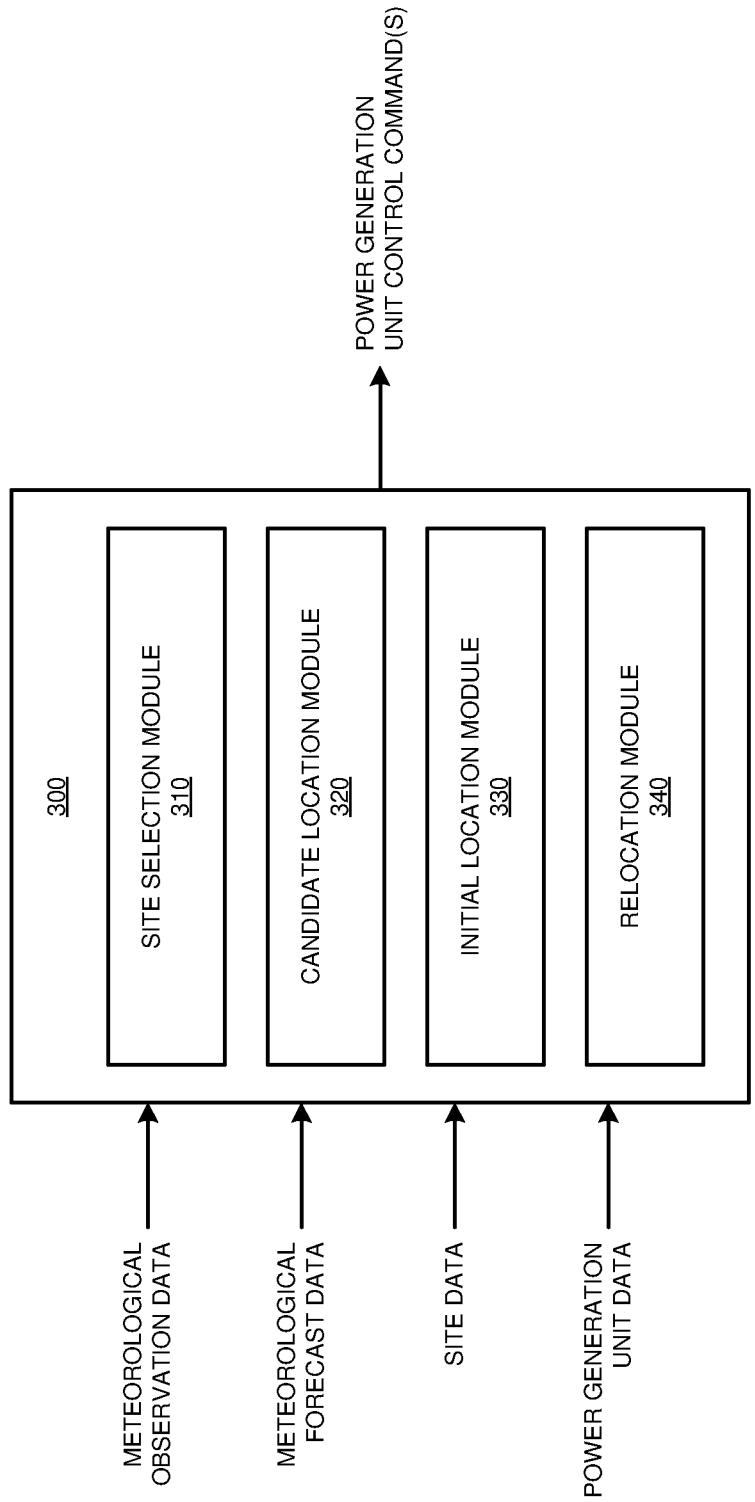
FIG. 3 depicts a block diagram of an example configuration for location optimization for an autonomous power generation unit in accordance with an illustrative embodiment.

With reference to FIG. 3, this figure depicts a block diagram of an example configuration for location optimization for an autonomous power generation unit in accordance with an illustrative embodiment. Application 300 is the same as application 200 in FIG. 1.

In the illustrated embodiment, application 300 receives a designated power generation site, or selects a power generation site using data provided to application 300. One non-limiting example of a power generation site is a rooftop of a building in a city. Application 300 also receives or selects power generation unit characteristics and other power generation unit data for a set of power generation units to be used at the power generation site.

Site selection module 310 selects power generation unit characteristics that are appropriate to a received or already-selected power generation site. For example, it might be cost-effective to deploy power generating units using solar power, but not cost-effective to deploy power generating units using wind power, at a particular site. As another example, a particular site might be too small to cost-effectively generate solar power, but have enough area to cost-effectively generate wind power. As a third example, one site might be flat and smooth enough to allow the use of autonomous power generating units with wheels, but another site might not be sufficiently flat, necessitating the use of autonomous aerial power generating units.

Another implementation of module 310 selects a power generation site using characteristics of a received or already-selected autonomous power generation unit to be used at the site. For example, if the autonomous power generation units to be used at the site are all solar power generation units that move using wheels, module 310 can eliminate possible power generation sites that are too small to host the number of units required for a cost-effective installation, too shaded to generate sufficient power to justify the installation, and insufficiently flat to allow the use of wheels. To select autonomous power generating units, module 310 receives specifications of possible autonomous power generating units (e.g., locomotion method and specifications for conditions under which the locomotion method is usable, solar panel area and power conversion efficiency at particular light levels, wind turbine area and power conversion efficiency at particular wind speeds, an installation and maintenance cost of each unit, and the like), or a requirements specification a selected autonomous power generating unit must meet (e.g., must use wheels for locomotion, must have a solar panel area within a particular range, must have a power conversion efficiency above a specified threshold, and the like). To select a power generation site, module 310 receives mapping and meteorological data for an area including the site (e.g., rooftop area and surface smoothness of a particular building, nearby structures that might block wind or sun from reaching a particular rooftop, seasonal variations in expected wind speed and direction within a typical day, seasonal variations in expected amount of sunlight and sun direction, and the like), or a requirements specification a selected power generation site must meet (e.g., rooftop area above a specified threshold, rooftop angle below a specified threshold, a number of hours of sunlight per day or average wind speed per day above a specified threshold, and the like).

Another implementation of module 310 uses cost data and a cost requirements specification to select an autonomous power generating unit, power generation site, or a combination. For example, for a cost-effective implementation, the cost of obtaining and maintaining autonomous power generating units and the site on which they operate must be a specified amount or percentage below the income produced by using the autonomous power generating units to generate power at the site.

Candidate location module 320 designates a set of candidate locations within a selected power generation site includes. Candidate locations are locations at which an autonomous power generation unit could be situated to perform a particular task, such as generating electricity or sending generated power to a power grid. For example, if the selected power generation site is a rectangular rooftop, module 320 might divide the rooftop into a grid, and the set of candidate locations might be individual cells within the grid. However, the set of candidate locations need not be any particular shape, or adjacent or contiguous with each other. Some candidate locations vary in their characteristics. For example, one candidate location might be in shadow at a particular time of day, or protected from wind from a particular direction, or include a base station a power generation unit could use to send generated power to a power grid.

Application 300 attempts to maximize the electricity generated by autonomous power generation units at a power generation site, by keeping autonomous power generation units in the maximum amount of sun, wind, or another power generation modality as possible. Application 300 also attempts to minimize operations that spend electricity, such as that spent moving an autonomous power generation unit from one candidate location to another to improve power generation or send generated power to a power grid. In particular, at each time step, application 300 attempts to position a power generation unit at a candidate location that is forecast to be as best as possible for the next N time steps. In implementations of application 300, N is a user-defined or predefined parameter. Thus, application 300 uses a presently available optimization solving technique (e.g., a quadratic optimization solver) to minimize a cost function J for the available power generation units and candidate locations. In one implementation, J is the sum, for each time step i into the future from 1 (now) to N, of $w_{Hi}(W_i^r-W_i^m)^2+w_{Li}(L_i^r-L_i^m)^2+E_i+w_{uHi}(\Delta u)^2+w_{vLi}(\Delta v)^2+E_{di}$, where $W_i^r$ represents the available wind speed for time i, $W_i^m$ represents the captured wind speed for time i, $L_i^r$ represents the available light intensity for time i, $L_i^m$ represents the captured light intensity for time i, $E_i$ represents energy lost to relocate an autonomous power unit, $E_{di}$ represents energy lost to deliver electrical power to a grid by relocating to a base station or transmitting power wirelessly, u represents wind intensity, v represents light intensity, $w_{Hi}$ represents a weighting coefficient for generating electricity from wind at time i, $w_{Li}$ represents a weighting coefficient for generating electricity from light at time i, and $w_{uHi}$ and $w_{vLi}$ represent penalizing coefficients for changes in wind and light respectively. If a power generation unit is not capable of generating electricity from one of light or wind, corresponding weighting terms are set to zero to remove those terms from the cost function. If a power generation unit is capable of generating electricity from another source, application 300 adds one or more additional terms to the cost function in a manner described herein. Another implementation of application 300 includes a term representing a distance involved in delivering generated power to a power grid in the cost function. Additional terms in the cost function, and different cost functions, are also possible. Application 300 obtains values for captured wind speed and captured light intensity from current or forecast meteorological data, from data of the selected power generation site, or a combination. For example, data of the selected power generation site might indicate that some candidate locations are protected from wind from a particular direction, current meteorological data might indicate the current wind speed and direction, and forecast meteorological data might indicate forecast wind speed and direction for particular times in the future. In one implementation of application 300, weighting coefficients are constant for all time steps. In another implementation of application 300, weighting coefficients decrease linearly with time steps. In another implementation of application 300, weighting coefficients decrease exponentially with time steps. Decreasing weighting coefficients with time prioritizes current conditions over future conditions.

Initial location module 330 selects an initial power generation location from the set of candidate locations using a modified cost function J, which is the sum, for each time step i into the future from 1 (now) to N, of $w_{Hi}(W_i^r - W_i^m)^2 + w_L^i (L_i^r - L_i^m)^2 + w_{uHi}(\Delta u)^2 + w_{vLi}(\Delta v)^2 + E_{di}$, if sufficient data is available. Another implementation of module 330 selects an initial power generation location from the set of candidate locations using a modified cost function J, which is the sum, for each time step i into the future from 1 (now) to N, of $w_{Hi}(W_i^r - W_i^m)^2 + w_{Li}(L_i^r - L_i^m)^2$, if sufficient data is available. Another implementation of module 330 selects an initial power generation location to maximize power generation under current conditions, without performing a forecast. Another implementation of module 330 selects an initial power generation location randomly, using a pseudo-random number generator. Another implementation of module 330 selects an initial power generation location using another presently available selection technique.

Application 300 causes generation of electricity, by an autonomous power generation unit, at the selected power generation location. Relocation module 340 forecasts, during the generation of electricity, a future power generation status of a power generation unit at the selected power generation location, and uses the future power generation status to decide whether or not to relocate a power generation unit. Module 340 relocates, or causes relocation of, a power generation unit to a second power generation location responsive to the future power generation status. One implementation of module 340 causes relocation of an autonomous power generation unit by commanding the power unit to relocate itself to the new location.

The relocation alters the future power generation status. For example, if the future power generation status was forecast to decrease due to a shadow or a change in wind speed or direction, the relocation is to a location that avoids the forecast decrease. As another example, if the future power generation status was forecast to decrease due to a power generation unit's storage battery being full, the relocation is to a location where stored electricity in the battery can be sent to a power grid. As a third example, if the future power generation status was forecast to decrease due to sunset or a decrease in wind speed, the relocation is to a location where stored electricity in a power generation unit's battery can be sent to a power grid, thus buffering electricity provision to the grid.

Module 340 repeats the forecasting and relocation responsive to the future power generation status. If available, module 340 uses updated forecasts or current meteorological data when repeating the forecasting and relocation. One implementation of module 340 uses a machine learning model (a presently available technique) to adjust one or more weights in the cost function using the effects of past meteorological conditions and forecasts on power generation at candidate locations within the power generation site. For example, module 340 might learn that a power generation unit in a particular candidate location does not generate sufficient electricity when the wind is from the north, due to the sheltering of that location by an adjacent building. As another example, module 340 might learn changes in shadow configurations due to the changing sun angles at different times of the year, or altered configurations of shadow-casting elements affecting a power generation site. Another implementation of module 340 uses a learning model to adjust weights in the cost function based on seasonal patterns. For example, module 340 might learn that cloudy mornings and sunny afternoons are typical in summer at a particular power generation site, and adjusts weights in the cost function accordingly. Another implementation of module 340 uses a learning model to adjust weights or terms in the cost function using the results of a past relocation. For example, module 340 might learn how long power generation units take to travel between particular candidate locations, or that some forecast wind or light changes are too small to justify relocation.

Figure 4:
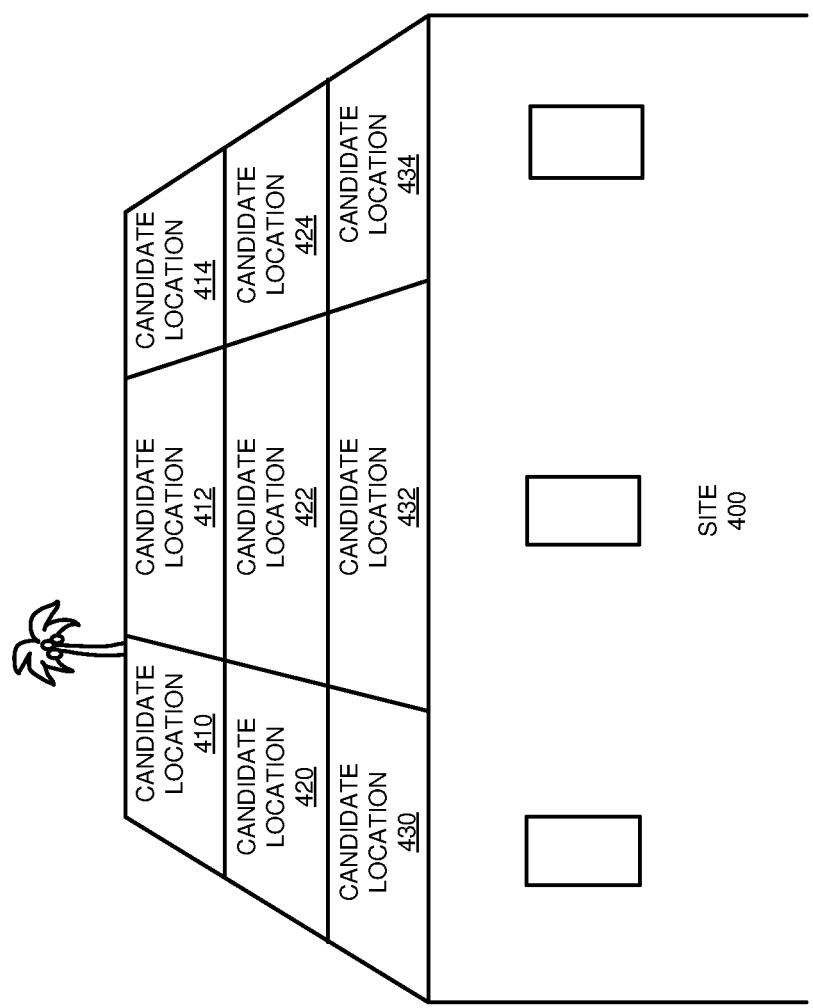
FIG. 4 depicts an example of location optimization for an autonomous power generation unit in accordance with an illustrative embodiment.

With reference to FIG. 4, this figure depicts an example of location optimization for an autonomous power generation unit in accordance with an illustrative embodiment. The example can be executed using application 300 in FIG. 3.

As depicted, power generate site 400 (a building rooftop) includes candidate locations 410, 412, 414, 420, 422, 424, 430, 432, and 434.

Figure 5:
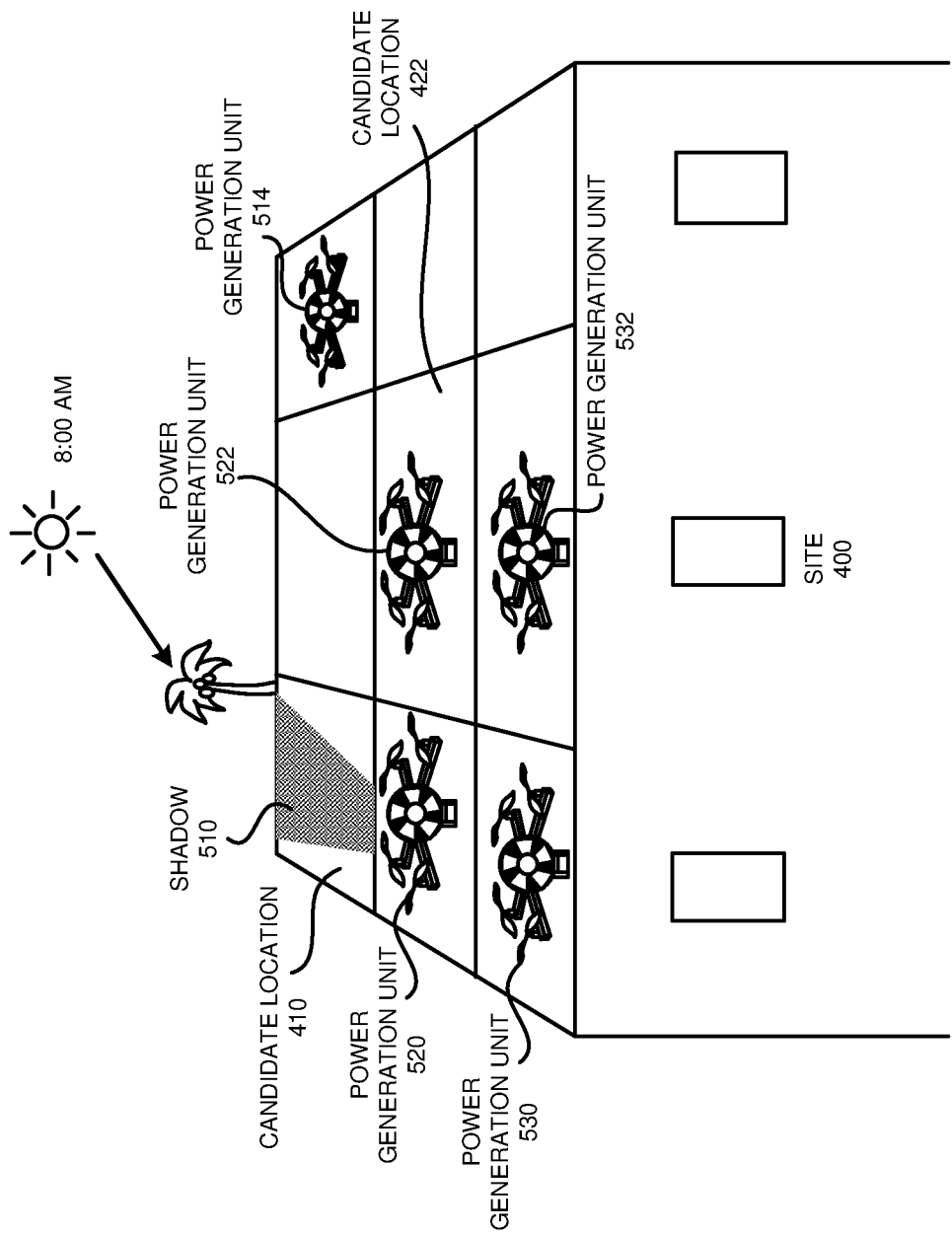
FIG. 5 depicts a continued example of location optimization for an autonomous power generation unit in accordance with an illustrative embodiment.

With reference to FIG. 5, this figure depicts a continued example of location optimization for an autonomous power generation unit in accordance with an illustrative embodiment. Site 400 and candidate locations 410 and 422 are the same as 4ite 400 and candidate locations 410 and 422. (The remainder of the candidate locations depicted in FIG. 4 remain in the same locations as in FIG. 4, but are not labelled in FIG. 5.)

As depicted, it is morning, and application 300 has positioned power generation units 514, 520, 522, 530, and 532. In particular, power generation unit is in candidate location 422. Power generation units 514, 520, 522, 530, and 532 generate electricity at least in part from solar power, and candidate location 410 is not currently occupied by a power generation unit because shadow 510 occupies most of candidate location 410, decreasing available solar energy in the location. Note that power generation units 514, 520, 522, 530, and 532 are depicted as examples only, and are not intended to illustrate any particular configuration, relocation method, or power generation method.

Figure 6:
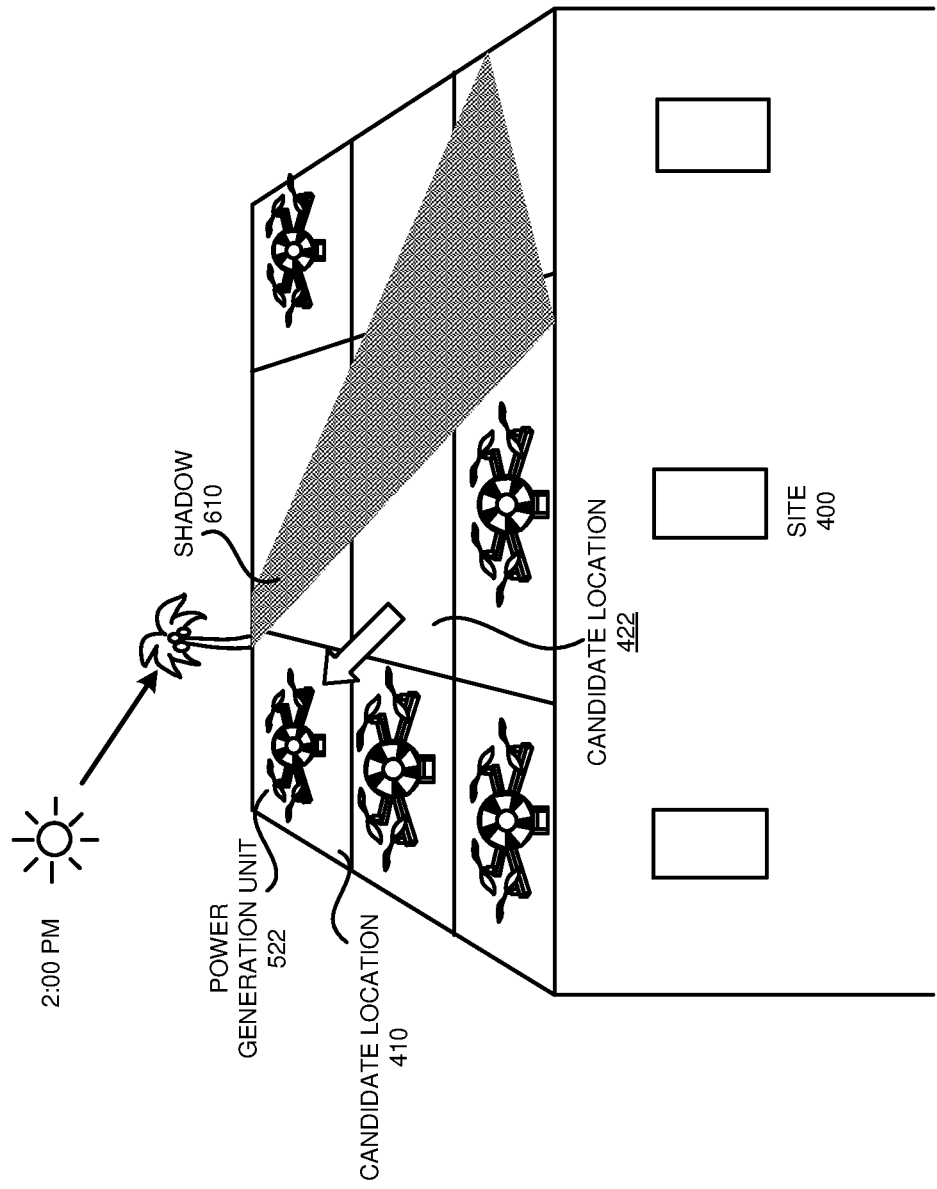
FIG. 6 depicts a continued example of location optimization for an autonomous power generation unit in accordance with an illustrative embodiment.

With reference to FIG. 6, this figure depicts a continued example of location optimization for an autonomous power generation unit in accordance with an illustrative embodiment. Site 400 and candidate locations 410 and 422 are the same as site 400 and candidate locations 410 and 422. Power generation unit 522 is the same as power generation unit 522 in FIG. 5.

As depicted, it is afternoon, and because the sun has moved, shadow 510 in FIG. 5 has been replaced by shadow 610 in FIG. 6. Consequently, application 300 has caused power generation unit 522 to relocate itself to candidate location 410, out of shadow 610 and in the former location of shadow 510.

Figure 7:
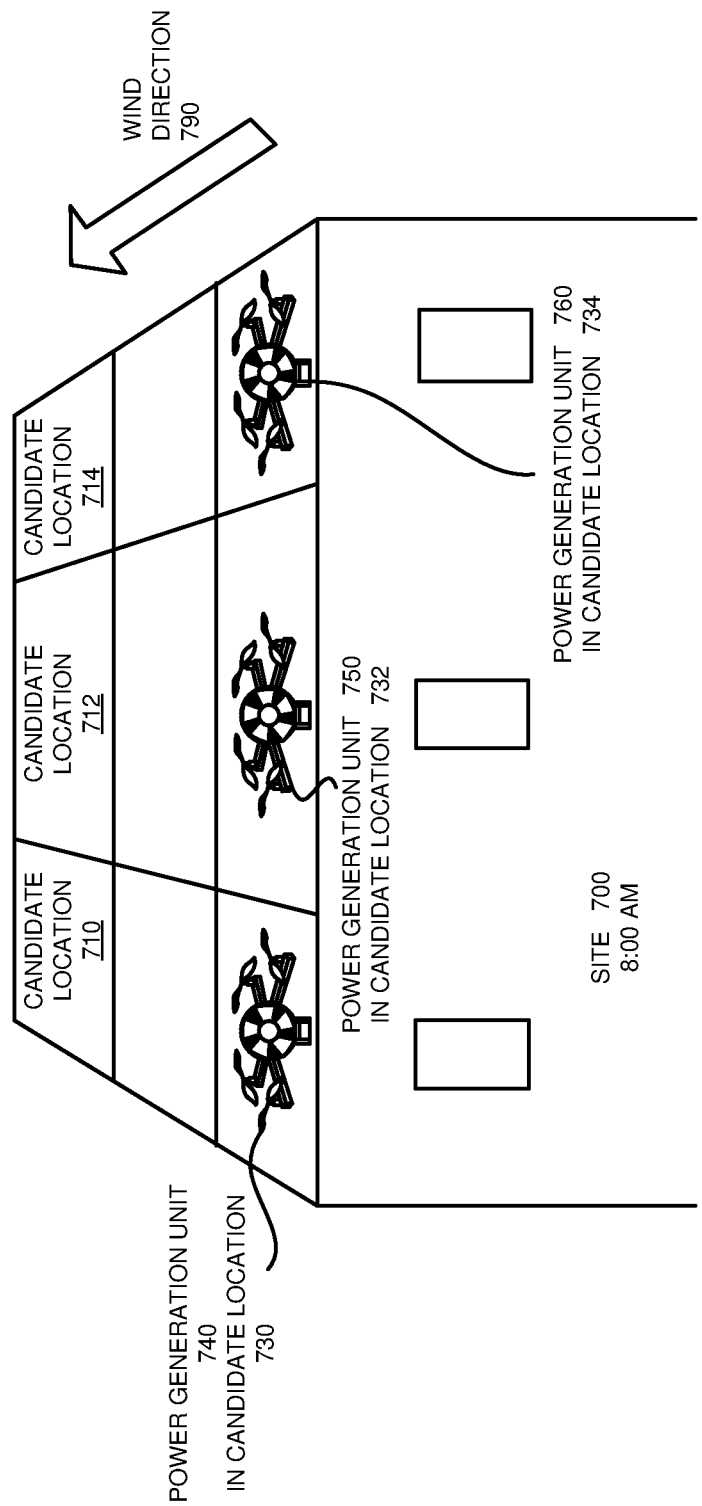
FIG. 7 depicts another example of location optimization for an autonomous power generation unit in accordance with an illustrative embodiment.

With reference to FIG. 7, this figure depicts another example of location optimization for an autonomous power generation unit in accordance with an illustrative embodiment. The example can be executed using application 300 in FIG. 3.

As depicted, site 700 (a building rooftop) includes candidate locations 710, 712, and 714 (all currently unoccupied). Power generation unit 740 is in candidate location 730, power generation unit 750 is in candidate location 732, and power generation unit 760 is in candidate location 734. Because power generation units 740, 750, and 760 generate electricity at least in part from wind power, application 300 has positioned power generation units 740, 750, and 760 to take advantage of wind direction 790. Note that power generation units 740, 750, and 760 are depicted as examples only, and are not intended to illustrate any particular configuration, relocation method, or power generation method.

Figure 8:
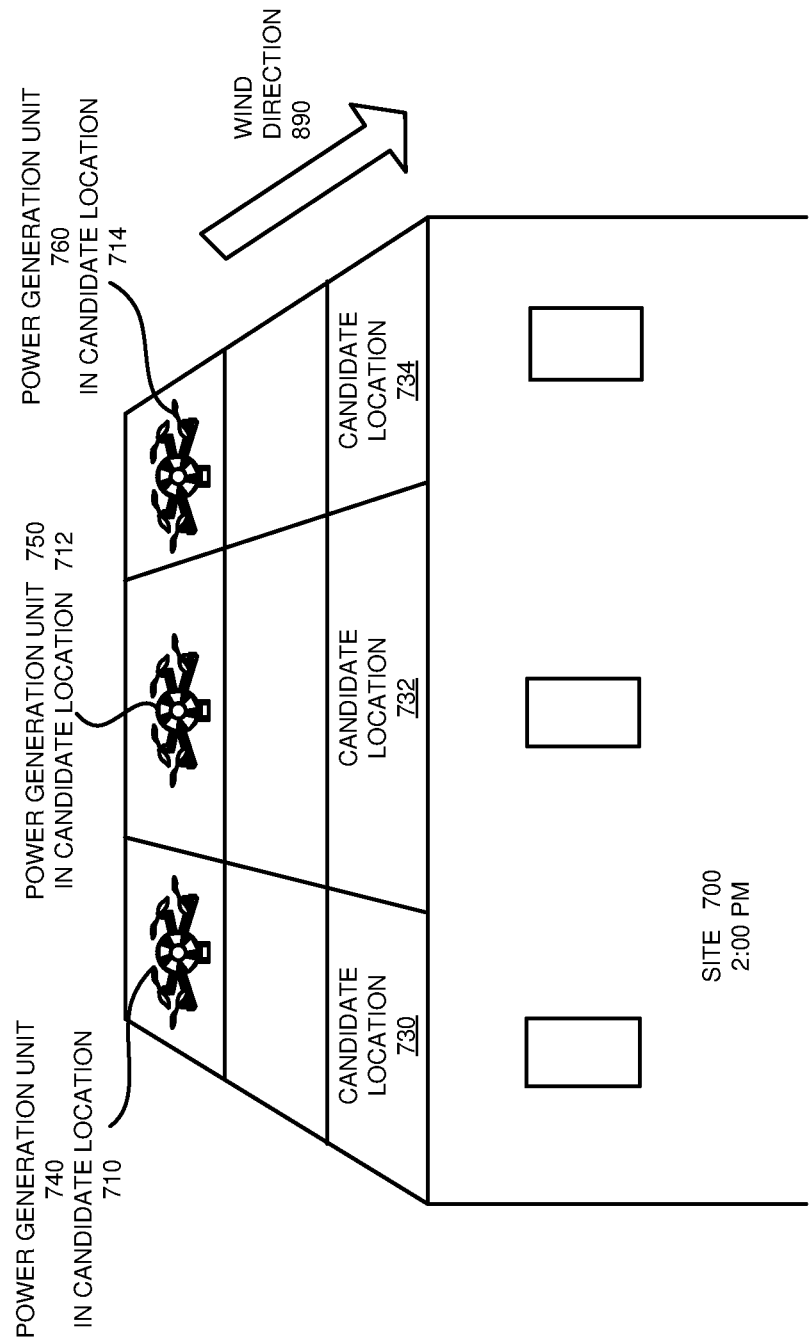
FIG. 8 depicts a continued example of location optimization for an autonomous power generation unit in accordance with an illustrative embodiment.

With reference to FIG. 8, this figure depicts a continued example of location optimization for an autonomous power generation unit in accordance with an illustrative embodiment. Site 700, candidate locations 710, 712, 714, 730, 732, and 734, and power generation units 740, 750, and 760 are the same as site 700, candidate locations 710, 712, 714, 730, 732, and 734, and power generation units 740, 750, and 760 in FIG. 7.

As depicted, now it is afternoon, and the wind has shifted to wind direction 890. Thus, power generation unit 740 has moved to candidate location 710, power generation unit 750 has moved to candidate location 712, and power generation unit 760 has moved to candidate location 714, to take advantage of wind direction 890.

Figure 9:
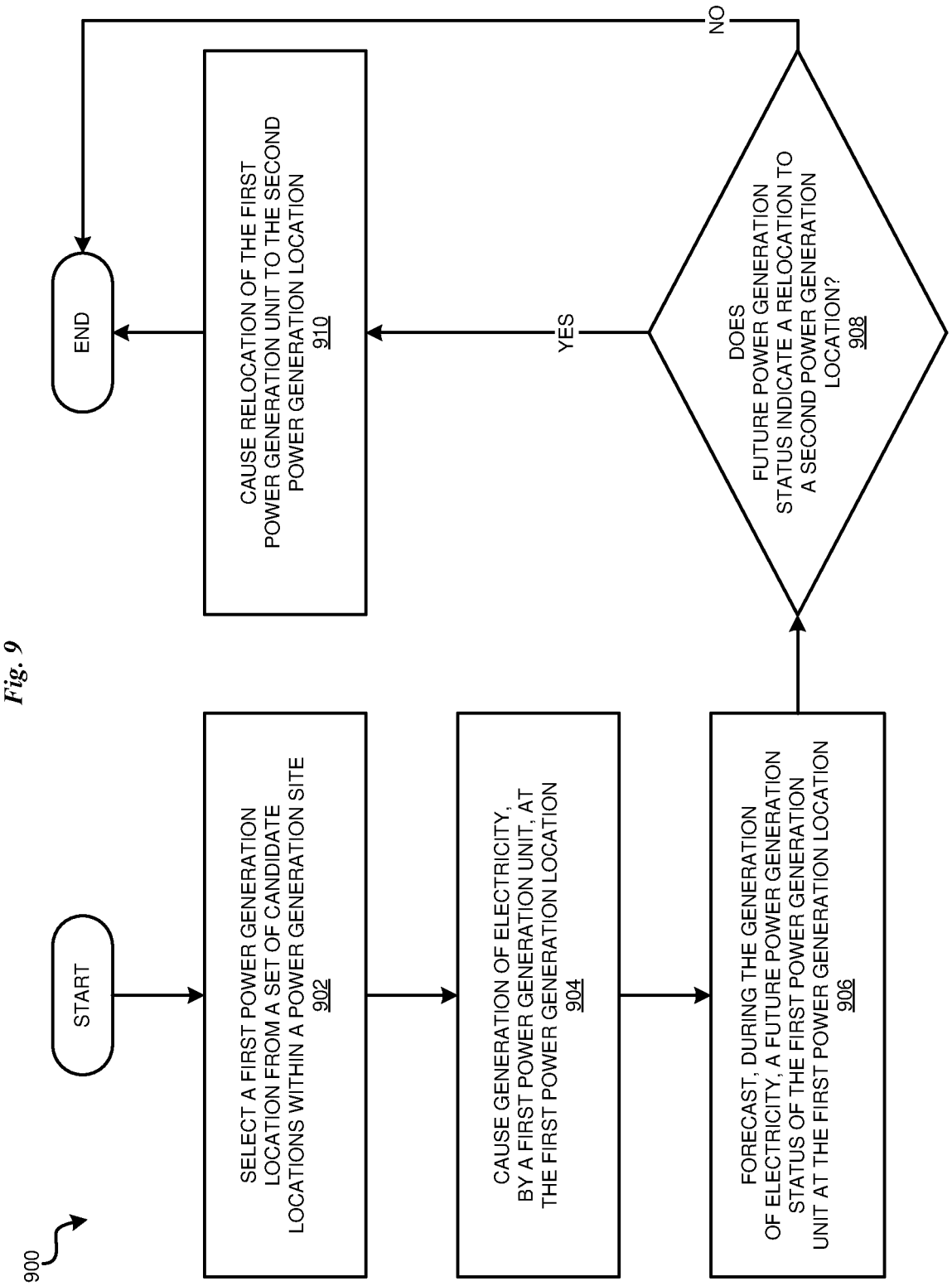
FIG. 9 depicts a flowchart of an example process for location optimization for an autonomous power generation unit in accordance with an illustrative embodiment.

With reference to FIG. 9, this figure depicts a flowchart of an example process for location optimization for an autonomous power generation unit in accordance with an illustrative embodiment. Process 900 can be implemented in application 300 in FIG. 3.

In the illustrated embodiment, at block 902, the process selects a first power generation location from a set of candidate locations within a power generation site. At block 904, the process causes generation of electricity, by a first power generation unit, at the first power generation location. At block 906, the process forecasts, during the generation of electricity, a future power generation status of the first power generation unit at the first power generation location. At block 908, the process determines whether future power generation status indicates a relocation to a second power generation location? If yes ("YES" path of block 908, at block 910, the process causes relocation of the first power generation unit to the second power generation location. Then (also "NO" path of block 908), the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    configuring a first power generation unit to receive a command for autonomous locomotion from an application executing in a data processing system;
    sending, from the application, the command to autonomously locomote and situate the power generation unit at a first power generation location from a set of candidate locations within a power generation site;
    forecasting, during power generation by the power generation unit, at the first power generation location, by factoring within the forecasting a configuration of a blockage cast by a ground-based blockage-casting element at a second power generation location at a future time, a future power generation status of the first power generation unit at the future time at the first power generation location, wherein the blockage comprises at least one of a shadow from light and a blockage from wind;
    selecting, responsive to the forecasting, a second power generation location; and
    commanding from the application, the power generation unit to initiate locomotion from the first power generation location to the second power generation location, the commanding causing an autonomous relocating of the power generation unit to the second power generation location by minimizing an energy cost of the relocating using an equipment specification of the power generation unit, the relocating altering the future power generation status.

2. The computer-implemented method of claim 1, further comprising:
    selecting the power generation site.

3. The computer-implemented method of claim 1, further comprising:
    selecting the power generation unit according to a characteristic of the power generation site.

4. The computer-implemented method of claim 1, further comprising:
    evaluating, responsive to the future power generation status, a cost function.

5. The computer-implemented method of claim 4, further comprising:
    adjusting, using a machine learning model, a weight of a term in the cost function.

6. The computer-implemented method of claim 5, wherein the weight is adjusted using an effect of a past meteorological condition on power generation at the set of candidate locations.

7. The computer-implemented method of claim 5, wherein the weight is adjusted using a result of a past relocation of the power generation unit.

8. A computer program product comprising one or more computer readable storage media, and program instructions collectively stored on the one or more computer readable storage media, the program instructions executable by a processor to cause the processor to perform operations, the operations comprising:
    configuring a power generation unit to receive a command for autonomous locomotion from an application executing in a data processing system;
    sending, from the application, the command to autonomously locomote and situate the power generation unit at a first power generation location from a set of candidate locations within a power generation site;
    forecasting, during power generation by the power generation unit, at the first power generation location, by factoring within the forecasting a configuration of a blockage cast by a ground-based blockage-casting element at a second power generation location at a future time, a future power generation status of the power generation unit at the future time at the first power generation location, wherein the blockage comprises at least one of a shadow from light and a blockage from wind;
    selecting, responsive to the forecasting, a second power generation location; and
    commanding from the application, the power generation unit to initiate locomotion from the first power generation location to the second power generation location, the commanding causing an autonomous relocating of the power generation unit to the second power generation location by minimizing an energy cost of the relocating using an equipment specification of the power generation unit, the relocating altering the future power generation status.

9. The computer program product of claim 8, wherein the stored program instructions are stored in a computer readable storage device in a data processing system, and wherein the stored program instructions are transferred over a network from a remote data processing system.

10. The computer program product of claim 8, wherein the stored program instructions are stored in a computer readable storage device in a server data processing system, and wherein the stored program instructions are downloaded in response to a request over a network to a remote data processing system for use in a computer readable storage device associated with the remote data processing system, the operations further comprising:

metering a use of the program instructions associated with the request; and generating an invoice based on the use.

11. The computer program product of claim 8, the operations further comprising:

selecting the power generation site.

12. The computer program product of claim 8, the operations further comprising:

selecting the power generation unit according to a characteristic of the power generation site.

13. The computer program product of claim 8, the operations further comprising:

evaluating, responsive to the future power generation status, a cost function.

14. The computer program product of claim 13, the operations further comprising:

adjusting, using a machine learning model, a weight of a term in the cost function.

15. The computer program product of claim 14, wherein the weight is adjusted using an effect of a past meteorological condition on power generation at the set of candidate locations.

16. The computer program product of claim 14, wherein the weight is adjusted using a result of a past relocation of the power generation unit.

17. A computer system comprising a processor and one or more computer readable storage media, and program instructions collectively stored on the one or more computer readable storage media, the program instructions executable by the processor to cause the processor to perform operations, the operations comprising:

configuring a power generation unit to receive a command for autonomous locomotion from an application executing in a data processing system;

sending, from the application, the command to autonomously locomote and situate the power generation unit at a first power generation location from a set of candidate locations within a power generation site;

forecasting, during power generation by the power generation unit, at the first power generation location, by factoring within the forecasting a configuration of a blockage cast by a ground-based blockage-casting element at a second power generation location at a future time, a future power generation status of the first power generation unit at the future time at the first power generation location, wherein the blockage comprises at least one of a shadow from light and a blockage from wind;

selecting, responsive to the forecasting, a second power generation location; and commanding from the application, the power generation unit to initiate locomotion from the first power generation location to the second power generation location, the commanding causing an autonomous relocating of the power generation unit to the second power generation location by minimizing an energy cost of the relocating using an equipment specification of the power generation unit, the relocating altering the future power generation status.

18. The computer system of claim 17, the operations further comprising:

selecting the power generation site.

\* \* \* \* \*